United States Patent [19]

Adam et al.

[11] Patent Number: 4,631,889
[45] Date of Patent: Dec. 30, 1986

[54] FIXING DEVICES

[75] Inventors: Ian R. Adam, Netherlee; James Mallon, Armadale, both of Scotland

[73] Assignee: ITT Corporation, New York, N.Y.

[21] Appl. No.: 559,362

[22] Filed: Dec. 8, 1983

[30] Foreign Application Priority Data

Dec. 17, 1982 [GB] United Kingdom ............... 8236001

[51] Int. Cl.$^4$ .............................................. E04B 1/02
[52] U.S. Cl. ...................................... 52/565; 52/704
[58] Field of Search ................ 52/565, 698, 704; 411/32–38, 389

[56] References Cited

U.S. PATENT DOCUMENTS

| 2,633,735 | 4/1953 | Dondero | 52/698 |
| 3,298,144 | 1/1967 | Fischer | 52/704 X |
| 4,293,259 | 10/1981 | Liebig | 411/32 |
| 4,472,088 | 9/1984 | Martin | 52/704 X |

FOREIGN PATENT DOCUMENTS

| 685643 | 1/1953 | United Kingdom | 411/34 |
| 1471763 | 4/1977 | United Kingdom | 52/704 |
| 2065757 | 7/1981 | United Kingdom | 52/565 |

Primary Examiner—Carl D. Friedman
Assistant Examiner—Creighton Smith

[57] ABSTRACT

A fixing device, such as an anchor or cavity wall tie, employs a deformable (radially expandible) sleeve element (6) to lock an end of a rod (1) in a bore (12) of a wall or like structure (11). Radial expansion may be achieved by axially compressing the sleeve element between a stop member (2) and an internally threaded member 9 arranged on a threaded portion (5) of the rod (1). The sleeve includes a rib (10), projecting from its radially outermost circumferential surface, which provides an interference fit for the sleeve in the bore prior to axial compression and thus substantially prevents rotation of the sleeve during compression.

8 Claims, 4 Drawing Figures

FIXING DEVICES

BACKGROUND OF THE INVENTION

This invention relates to fixing devices and in particular to anchors and cavity wall ties which are secured in bores of structures by means of expandable elements comprised by cylindrical sleeves which are radially expandable upon axial compression.

SUMMARY OF THE INVENTION

According to the present invention there is provided a fixing device comprising a rod, having a first end to be secured in a bore of a structure, and an anchoring device for the first rod end including a sleeve element of deformable material arranged on the rod, which sleeve element is radially expandible upon axial compression, and means for causing axial compression and thus radial expansion of the sleeve element, in use of the fixing device, whereby to grip the bore wall, and wherein the sleeve member has at least one rib projecting from its radially outermost circumferential surface.

BRIEF DESCRIPTION OF THE DRAWING:

Embodiments of the invention will now be described, by way of example, with reference to the accompanying drawings, in which.

DETAILED DESCRIPTION

Figure 1:
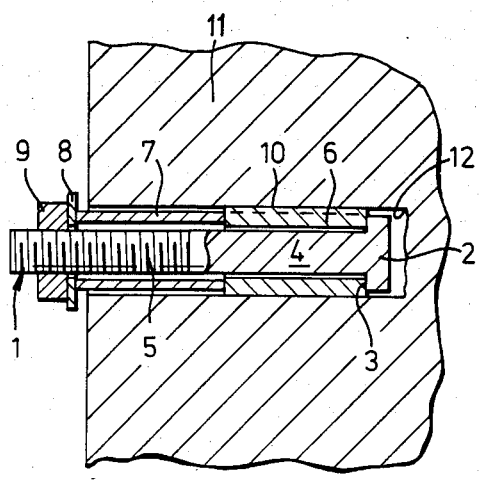
FIG. 1 shows, schematically and in section, an anchor device according to an embodiment of the present invention inserted in a bore before expansion of the expandable element.
Figure 2:
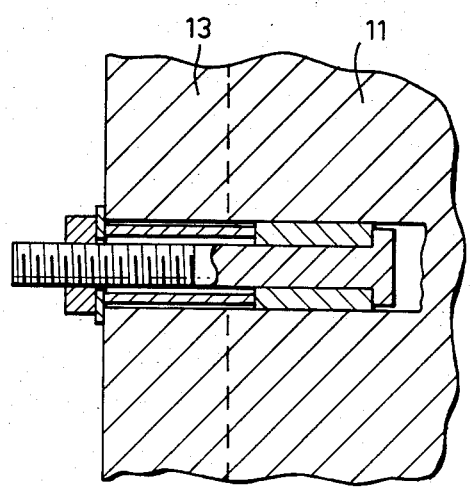
FIG. 2 shows the anchor device of FIG. 1 after expansion of the expandable element.

The anchor device shown in FIGS. 1 and 2 with its expandable element in the unexpanded and expanded states, respectively, includes a rod comprised by a metallic bolt 1 of, for example, stainless steel, having a head 2, which presents a shoulder 3, which may be dovetailed or undercut, to a shank 4 of the bolt which is threaded at least at its end 5. Mounted on the shank of the bolt adjacent head 2 is a substantially cylindrical sleeve 6 of such a material that it is radially expandable upon axial compression, for example, and a cylindrical non-deformable sleeve 7, which may be of stainless steel, a washer 8 and a nut 9. The sleeves 6 and 7 are initially loosely mounted on the shank of the bolt. As can be appreciated most readily from FIG. 3 the deformable sleeve 6 is provided with a rib 10 along its length. The rib 10 projects radially from the cylindrical body of the sleeve 6 and may be somewhat triangular in section so that its thickness decreases in the radially outward direction. Whilst only one rib is shown, embodiments with more than one rib may be employed. Such a sleeve may be manufactured by the extrusion of long lengths of sleeving with the section shown and subsequent cutting of the extrusion to provide individual sleeves of a required length. Typically the for a wall tie rib projects radially 1 mm from the outer circumference of a cylindrical sleeve which is approximately 12 mm external diameter. The rib may extend subtantially axially along the length of the sleeve, which arrangement facilitates extrusion.

In order to anchor the bolt 1 into a wall 11, for example, a hole 12 is bored in the wall 11, the diameter of the bored hole 12 being slightly larger than the bolt head 2 but such that the sleeve 6 in view of the rib 10 is an interference fit in the hole 12. The bolt with sleeves 6, 7 arranged thereon is then tapped into the hole 12 to adopt the position shown in FIG. 1 with the sleeve 6 being an interference fit therein. During the insertion into bore 12, the rib 10 may be roughened or damaged upon contact with the bore wall, which roughening will serve to improve the adhesion of the sleeve 6 in the bore 12 at the onset of axial compression. A spanner (not shown) is then applied to nut 9 whereby to screw it further onto bolt 1 and thus create a compressive axial load between head 2 and sleeve 7 whereby to compress and thus radially expand sleeve 6 and lock it to bore 12, as indicated in FIG. 2. The rib 10 and the interference fit means that sleeve 6 will not rotate significantly in the bore 12 during the screwing on of nut 9 and this enables improved performance to be achieved. An eye (not shown) may be screwed onto the end of the bolt 1 which protrudes from the wall 11. Alternatively, the bolt 1 may be employed to anchor a member 13 to a wall 11, in which case the bolt extends through a bore in member 13 into bore 12, as indicated by the dotted line in FIG. 2. Whereas anchoring of bolt 1 to a wall has been described, it can alternatively be similarly anchored to a floor or other structures.

The ribbed type of expandable sleeve described above can also be used for other anchoring purposes, an example being a cavity wall tie and in particular a remedial cavity wall tie for replacing wall ties employed when a cavity wall was built but which have since corroded.

Figure 4:
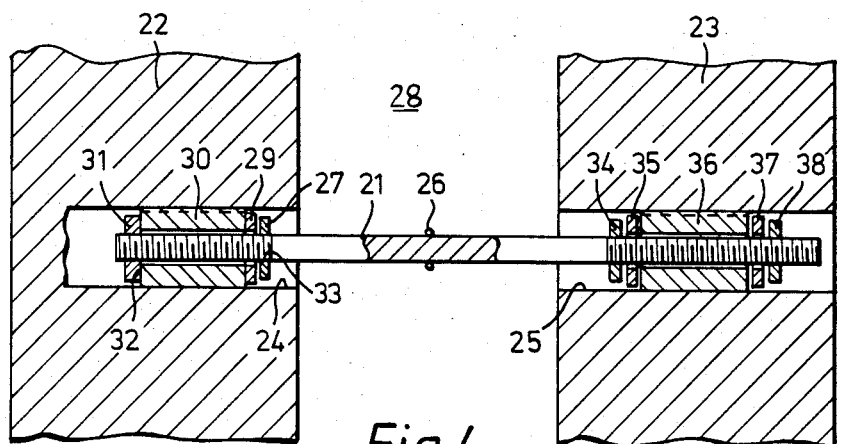
FIG. 4 shows, schematically, a section through a cavity wall whose leaves are tied together by a wall tie according to another embodiment of the present invention.

In the embodiment of the invention shown in FIG. 4, a stainless steel tie rod 21 is secured to both leaves 22 and 23 of a cavity wall. Generally leaf 22 will be the inner leaf and leaf 23 the outer leaf, since in existing buildings it is normally preferable to drill from the outside in rather than vice versa, although alternatively leaf 22 may be the outer leaf and leaf 23 the inner leaf. Wall leaf 22 is provided with a blind bore 24 and wall leaf 23 is provided with a through bore 25. Through bore 25 is drilled first and subsequently blind bore 24 is drilled through bore 25 so that bores 24 and 25 is aligned. The rod 21 may be threaded over its entire length or, as shown, only at its ends, the centre section being unthreaded.

Figure 3:
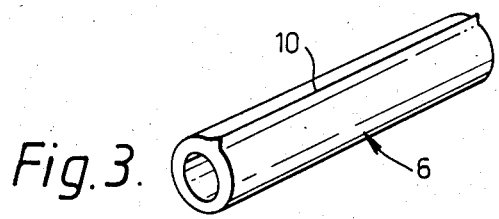
FIG. 3 shows a view of the expandable element of FIGS. 1 and 2.

Prior to insertion in the bores 24 and 25, the tie rod 21, expandable elements and associated components, and a drip ring 26 are assembled together to form a tie assembly. The expandable element and associated components associated with the inner leaf 22 comprise a nut 27, which is locked to rod 21, for rotation therewith, at the axial position shown that, in use of the tie assembly, is adjacent the cavity 28 between the wall leaves 22 and 23,; a washer 29; an expandable element 30 comprising a substantially cylindrical sleeve of plastics material, for example polyvinyl chloride, having a longitudinal rib as shown in FIG. 3; and an internally threaded collar 31 with a roughened high friction face 32 adjacent sleeve 30. The nut 27 may be locked to the rod 21 as a result, for example, of the threaded portion 33 of the rod having been distorted so as to prevent the nut passing beyond that portion, particularly if the rod is threaded along its entire length. The expandable element and associated components associated with wall leaf 23 comprise a nut 34, which is locked to the rod 21 at the axial position shown that, in use of the tie assembly, is adjacent the cavity 28; Adjacent the cavity 28; a washer 35; an expandable element 36 also comprising a substantially cylindrical plastics element of polyvinyl chloride with a or without longitudinal external rib; a washer 37 and a nut 38. The drip ring 26 is positioned between the two expandable elements such as to be arranged centrally within cavity 28 and may be in the form of a resilient ring element made, for example, of rubber or neoprene, and a tight fit on the rod. The drip ring 26 serves to prevent the passage of moisture from one wall leaf to the other via the rod 21. To use the tie assembly of FIG. 4 a setting tool (not shown) is screwed on to right hand end (as viewed in FIG. 4) of rod 1 and this assembly tapped through the outer leaf 23 and into the inner leaf 22 so that the rod 1 adopts the position shown. The sleeves 30 is an interference fit in the bores 24. A torque spanner (not shown) is fitted to the right hand end of the setting tool and the assembly rotated thus rotating rod 1. Due to the interference fit of sleeve 30 in bore 24, sleeve 30 does not rotate and the collar 31, effectively locked thereto by the high friction face 32 is drawn further onto the rod 1 whereby to axially compress sleeve 30 and radially expand it for locking to leaf 22. The friction between the nut 27 and the washer 29 is low so that the nut can rotate freely with respect to the washer. By turning the unit until the torque spanner "breaks" at a predetermined value, for example 5 ft/lbs, it can be ensured that the rod is locked to the inner leaf 22. The setting tool is then removed from the right hand end of rod 1 and another tool (not shown) for example a box key or slotted screw driver applied to nut 38, nut 34 being locked to rod 1, and nut 38 is rotated by a torque spanner applied to the other tool, thus axially compressing the sleeve element 36 and radially expanding it to lock it to leaf 23. By turning the nut 38 until the torque spanner "breaks" at a predetermined value, for example 5 ft/lbs, it can be ensured that the rod is locked to leaf 23. The bore 25 the sleeve 36 does not become radially expanded upon rotation of the rod which serves to expand sleeve 30 and lock it to leaf 22. The plain washers 29, 35 and 37 serve to assist the axial compression and confine the radial expansion of the sleeve elements 30 and 36 whereby to maximise the locking effect between the sleeve elements and the respective leaves. Once a tie is locked to both wall leaves the setting tools are removed and the outermost end of the bore 25 may be filled with mortar. In view of the rib on the sleeve 30 greater tolerances in the bore diameter can be accommodated than hitherto.

In cases where one wall leaf 23, for example, is of a low grade material, it may be alternatively preferable to use a resin-grout fixing of the rod to that wall leaf, such as is described in our co-pending Application No. 81 34892 (I. R. Adam-J. Mallon 20-3). In addition, if appropriate, one of the ribbed sleeve expanders of the tie rod of FIG. 4 may be replaced by an alternative type of expander arrangement. Various such expander arrangements are described in our co-pending Application No. 80 35638 I. R. Adam-J. Mallon 18-1). Attention is also directed to our co-pending Application No. 82 08459 (I. R. Adam-J. Mallon 21-4).

The tie assemblies described above with respect to FIG. 4 are of low cost since they use entirely standard nuts, washers, threaded rods etc. The length of the overall tie assembly can be varied simply by changing the length of threaded studding used for the rod 1. The tie assemblies may be supplied fully assembled, comprising the expandable elements with associated components, together with a drip ring, so that actual installation is very fast and simple. Alternatively, the various piece parts may be supplied for assemblies by the installer prior to installation. In any event, the fully assembled tie is inserted into the bores as a single unit and it is not required to fit the drip ring and/or an outermost expandable element onto the rod part way through the installation procedure, as is the case with certain conventional ties.

We claim:

1. A fixing device comprising a rod having a first end and a second end, said first end to be secured in a bore of a structure, and an anchoring device for the first rod end including a sleeve element of deformable material arranged on the rod, which sleeve element is radially expandable upon axial compression, and means for causing axial compression and thus radial expansion of the sleeve element in use of the fixing device, whereby to grip the bore wall, and wherein the sleeve member has at least one rib projecting from its radially outermost circumferential surface, wherein each said first and second end is threaded and wherein the axial compression means comprise an internally threaded member, adapted for screwing on the first rod end, and a stop member inwardly of the first rod end, a sleeve element being arranged between the internally threaded member and the stop member, and wherein axial compression of the sleeve element in use of the fixing device is achieved by rotating the rod, said fixing device forming a cavity wall tie, the first rod end being for securement in a first cavity wall leaf, said second rod end being for securement in a second cavity wall leaf, said device including means whereby there is a higher frictional connection between the internally threaded member and the sleeve element than between the stop member and the sleeve element such that during installation of the first rod end of the wall tie, radial expansion of the sleeve element, for anchoring the first rod end in the respective cavity wall leaf bore, can be achieved by rotation of the rod, said device further including an anchoring device for the second rod end, which second rod end is threaded, comprising a further stop member on the second rod end adjacent the cavity between the leaves, a further internally threaded member adapted for screwing on the second rod end, a further sleeve element of deformable material arranged on the rod between the further stop member and the further internally threaded member, and wherein during installation the further sleeve element is radially expanded, after expansion of the sleeve element associated with the first rod end, by securing the further internally threaded member towards the further stop member.

2. A fixing device as claimed in claim, 1 wherein the frictional connection means comprises a roughened high friction end face of the internally-threaded member.

3. A fixing device as claimed in claim 1, wherein the further sleeve element has at least one rib projecting from its radially outermost circumferential surface.

4. A fixing device as claimed in claim 1, wherein the second rod end is adapted for securement in the second cavity wall leaf by resin grouting.

5. A fixing device as claimed in any one of claims 1, 2, 3 or 4 for installation with the first rod end anchoring device in a blind bore and the second rod end extending in a through bore of the respective leaves of the cavity wall, the second rod end being such that the rod can be rotated by means applied to the second rod end whereby to radially expand the sleeve element of the anchoring device of the first rod end.

6. A fixing device as claimed in claim 5, including a drip ring for arrangement on the rod between the first and second ends thereof.

7. A fixing device as claimed in claim 6, wherein the rod is of stainless steel.

8. A fixing device as claimed in, claim 6, wherein the expandable sleeve element is comprised of polyvinyl chloride.

* * * * *